US006406238B2

(12) United States Patent
Takeuchi et al.
(10) Patent No.: US 6,406,238 B2
(45) Date of Patent: *Jun. 18, 2002

(54) EARTH NUT

(75) Inventors: Toshio Takeuchi; Hideki Kakamu, both of Aichi (JP)

(73) Assignee: Aoyama Seisakusho Co., Ltd., Aichi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,504

(22) PCT Filed: Feb. 2, 1999

(86) PCT No.: PCT/JP99/00421

§ 371 (c)(1),
(2), (4) Date: Oct. 5, 1999

(87) PCT Pub. No.: WO99/40330

PCT Pub. Date: Aug. 12, 1999

(30) Foreign Application Priority Data

Feb. 5, 1998 (JP) ............................................ 10-24105

(51) Int. Cl.[7] ................................................ F16B 37/00
(52) U.S. Cl. ....................................... 411/188; 411/437
(58) Field of Search .......................... 411/184–188, 437

(56) References Cited

U.S. PATENT DOCUMENTS 1,956,745 A * 5/1934 Payne
2,226,491 A * 12/1940 Gustafson
3,343,580 A * 9/1967 Coldren
3,352,344 A * 11/1967 Lanius
4,289,181 A * 9/1981 Capuano ..................... 411/187
4,293,256 A * 10/1981 Pamer ......................... 411/186
4,889,460 A * 12/1989 Laidlaw ....................... 411/437
5,183,359 A * 2/1993 Barth
6,135,689 A * 10/2000 Matsunami

FOREIGN PATENT DOCUMENTS

| | | |
|---|---|---|
| DE | 2533503 | * 11/1976 |
| GB | 2098695 | * 11/1982 |
| JP | 63-27712 | 2/1988 |
| JP | 64-53610 | 4/1989 |
| JP | 55-158581 | 11/1990 |
| JP | 8-23817 | 5/1995 |

* cited by examiner

*Primary Examiner*—Flemming Saether
(74) *Attorney, Agent, or Firm*—David G. Conlin; William J. Daley, Jr.; Edwards & Angell, LLP.

(57) ABSTRACT

The present invention has been accomplished to provide an earth nut which has an excellent grounding performance, and which is free from the possibility of losing a grounding function even upon application of a high axial force and is low in cost, said earth nut comprises a flanged nut having a flange, which is formed at a lower end of a nut body to be integral with the nut body, a plurality of projections formed at a lower portion of the flange near an outer peripheral edge of the flange for cutting and peeling off a coating film on a seat surface, with which a bottom surface of the nut contacts, and a plurality of longitudinal grooves provided on screw threads of a female thread portion of the nut body to extend axially of the nut body and having edges on one sides of lines of intersection of the screw threads of the female thread portion of the nut and the longitudinal grooves to peel off a coating film adhered to screw threads of a bolt, onto which the nut are screwed.

12 Claims, 3 Drawing Sheets

(A)

(B)

EARTH NUT

TECHNICAL FIELD

The present invention relates to an earth nut for use in fixing a metallic part, of which surfaces are coated with paint, to a mating member such as a vehicle body or the like in grounding condition.

BACKGROUND OF THE INVENTION

Conventionally, a nut 20 having a toothed washer as shown in FIG. 4 has been used to fix a metallic part, of which surfaces are coated with paint, to a mating member such as a vehicle body or the like while ensuring grounding. The nut 20 with the toothed washer comprises a washer 22 having a multiplicity of pointed teeth 21 formed on a periphery of a metallic plate and a nut body 23 to a lower end of which said washer is attached such as by welding. When the nut 20 with the toothed washer is rotated, tip ends of the teeth 21 cut and peel off a coating film on a seat surface, with which the nut contacts, to get at a metallic portion inside the metallic part, thus providing for electrical conduction.

Even when the teeth 21 get at the metallic portion inside the coating film to ensure electrical conduction between the nut body 23 and the metallic part, however, the metallic part cannot be sometimes grounded to a mating member such as a vehicle body or the like because electrical conduction cannot be provided between the nut body 23 and a bolt in the case where the coating film adheres to screw threads of the bolt, onto which female threads of the nut body 23 are screwed.

Also, there has been caused a problem that, when a high axial force acts on the nut 20 with the toothed washer, the teeth 21 on the washer 22 experience permanent set in fatigue to eliminate electrical conduction between the nut and the metallic part.

Further, there has been caused a problem that, when the coating film adheres to screw threads of the bolt, the coating fills screw valleys when the nut is screwed onto the bolt, resulting in defective fastening.

Besides, there has been caused a problem that the nut with the toothed washer are composed of two pieces including the washer 22 and the nut body 23, which leads to an increased cost.

SUMMARY OF INVENTION

The present invention has been accomplished to provide an earth nut which is capable of solving the above described problems of the prior art, that is, an earth nut which is capable of surely fixing a metallic part to a mating member such as a vehicle body or the like while grounding the metallic part even if a coating film adheres to screw threads of a bolt, and which is free from the possibility of losing a grounding function even upon application of a high axial force and is low in cost.

The earth nut of the invention having been accomplished to solve the above described problems comprises a flanged nut having a flange, which is formed at a lower end of a nut body to be integral with the nut body, a plurality of projections formed at a lower portion of the flange near an outer peripheral edge of the flange for enabling cutting and peeling off a coating film on a seat surface, with which a bottom surface of the nut contacts, and a plurality of longitudinal grooves provided on screw threads of a female thread portion of the nut body to extend axially of the nut body and having edges on one sides of lines of intersection of the screw threads of the female thread portion of the nut and the longitudinal grooves to peel off a coating film adhered to screw threads of a bolt, onto which the nut are screwed.

In addition, it is preferable that the projections are formed by downwardly pressing upper portions at a plurality of locations near the outer peripheral edge of the flange.

Further, it is preferable that the projections are three in number and are equally distributed Because the earth nut of the invention comprises the longitudinal grooves (with edges) provided on screw threads of a female thread portion of the nut to extend axially of the nut body, the edges can cut and peel off a possible coating film adhered to screw threads of a bolt to provide electrical conduction between the bolt and the earth nut. Further, failure in fastening of the nut is not generated since the coating peeled off can be discharged outside the nut through the longitudinal grooves.

Also, because a coating film on a seat surface, with which a bottom surface of the earth nut contacts, can be cut and peeled off by the projections formed at the lower portion of the flange near the outer peripheral edge of the flange, it is possible to fix a metallic part to a mating member while effecting grounding.

Further, since these projections are formed by making use of a portion of the flange of the flanged nut, they will not undergo permanent set in fatigue even in the event of being acted by a high axial force, and so the nut can exhibit a loosening resistant effect and attain cost reduction due to the possibility of one-piece design.

DESCRIPTION OF THE PREFERRED EMBODIMENT

Figure 1:
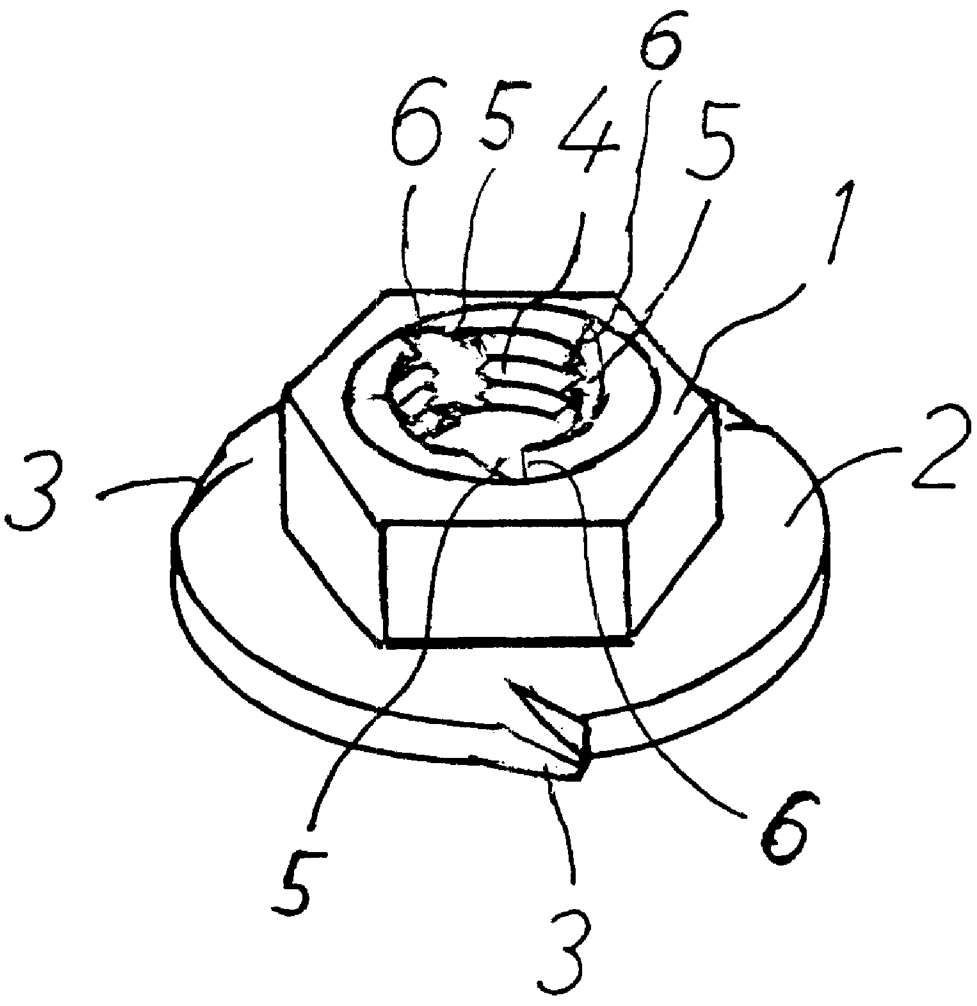
FIG. 1 a perspective view showing an earth nut according to an embodiment of the invention as a whole.
Figure 2:
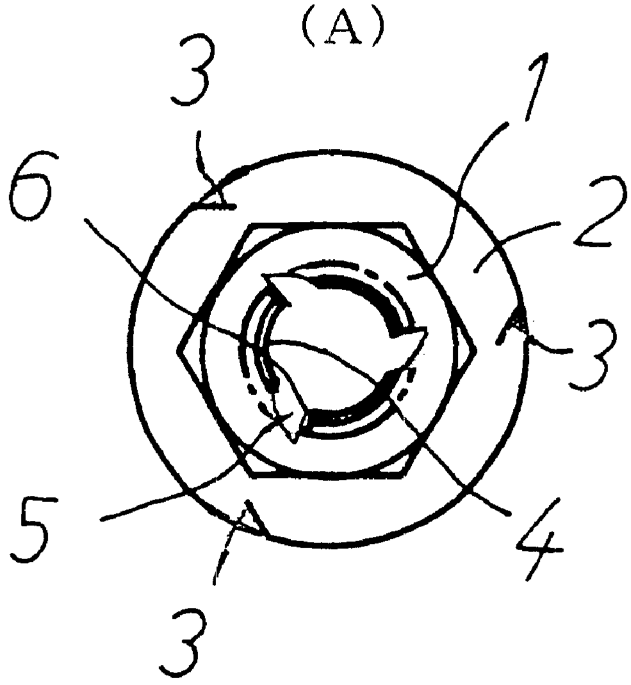
FIG. 2 is a view showing an earth nut according to an embodiment of the invention, (A) being a plan view and (B) being a cross sectional view.
Figure 2:
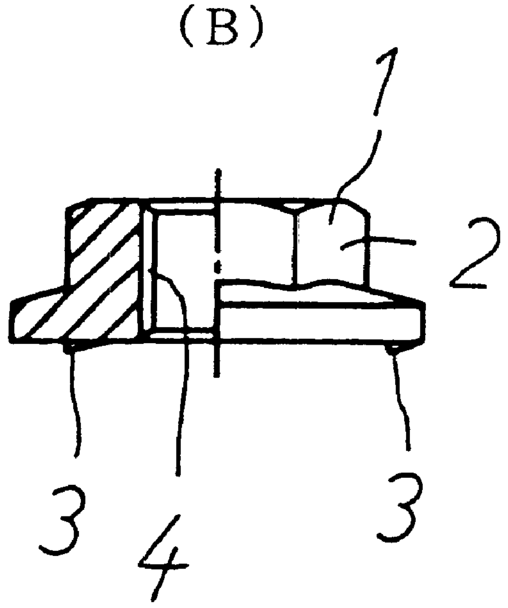

An earth nut according to the invention will be described hereinafter in details with reference to FIGS. 1 to 3.

In the drawings, the reference numeral 1 designates a nut body of a nut with a metallic flange, and 2 a flange section formed at a lower end of the nut body 1 to be integral therewith. As apparently shown in FIGS. 1 and 2(A), a plurality of projections 3 are formed on an underside of and near outer periphery of the flange section. These projections 3 function to peel off a coating film on a seat surface, with which a bottom surface of the nut contacts, and protrude from the underside (seat surface side) of the flange section 2. In the embodiment, the flange section 2 has three points thereof near the outer peripheral edge thereof subjected to press working in a downward direction (actually, the flange section is subjected to only press working but a more clear understanding of a working method and a configuration after the working will be given if thinking that notches are formed at an angle somewhat offset from a diametrical direction of the flange section and an upper surface on one sides of the notches are subjected to press working), whereby only those portions at the points are made to undergo plastic deformation toward the underside (seat surface side) to form the projections 3, of which tip ends are substantially triangular.

Also, that portion 4 of the nut body 1, on which female threads are formed, is formed with a plurality of longitudinal grooves 5 in an axial direction of the nut body. These longitudinal grooves 5 are non-symmetrical, semi-circular in a cross section defined by a plane perpendicular to an axis of the nut body, and are formed such that one (a surface disposed in a reverse direction to a direction of rotation when the nut is screwed onto the bolt 9) of surfaces leading to bottoms of the longitudinal grooves from lines of intersection between the screw threads, which are notched by formation of the longitudinal grooves 5, and the longitudinal grooves 5 has a sharp edge 6. These edges 6 exhibit a function for peeling off the coating film adhered to the screw threads of the bolt, onto which the female threads are to be screwed.

Figure 3:
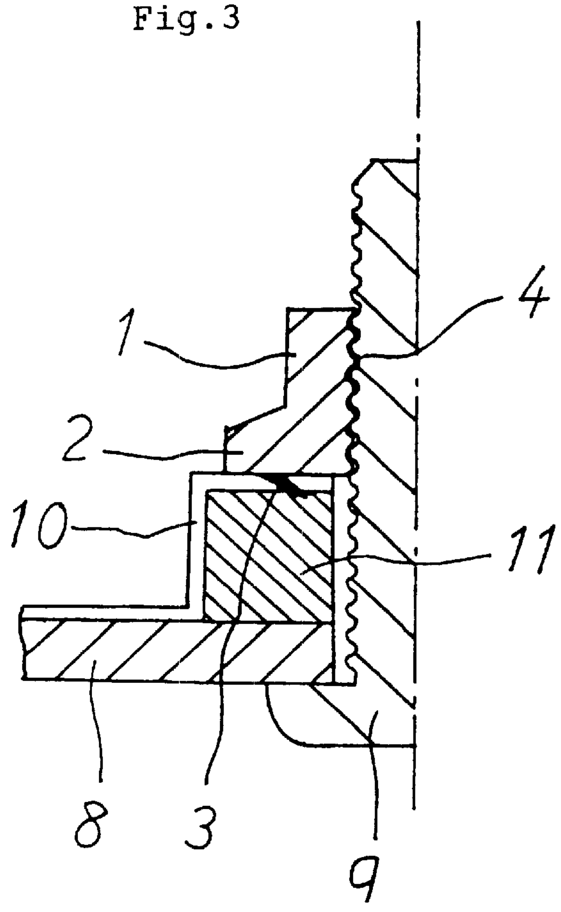
FIG. 3 is a partial, cross sectional view showing a state, in which an earth nut according to an embodiment of the invention is used.
Figure 4:
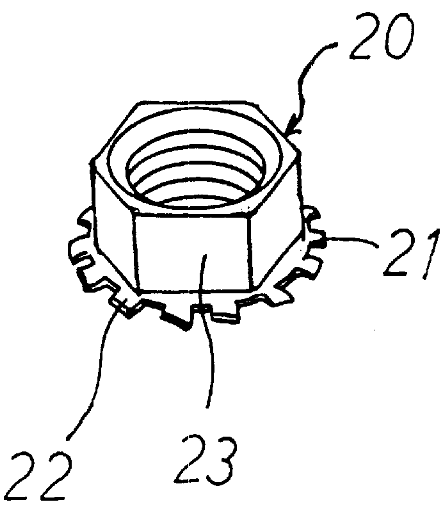
FIG. 4 is a perspective view showing a nut with a toothed washer, typifying conventional earth nuts.

FIG. 3 is a partial, cross sectional view showing a state, in which an earth nut according to an embodiment of the invention is used. In the drawing, a weld bolt 9 is welded to a mating member 8 such as a vehicle body or the like, and a metallic part 11, surfaces of which are covered with a coating film 10 (normally, the coating film is existent also on a joint surface of the mating member and the metallic part), is fastened by the earth nut of the invention. As described above, the plurality of projections 3 formed on the underside of and near the outer peripheral edge of the flange section 2 peel off the coating film 10 on the metallic part 11, which serves as a seat surface for the flange section when the earth nut is screwed onto the weld bolt, to ensure electrical conduction between the metallic part 11 and the earth nut. Also, when the mating member 8 is subjected to coating after the weld bolt 9 has been welded to the mating member 8, the coating also adheres to screw threads of the weld bolt 9. However, the coating film on the weld bolt is peeled off by the sharp edges 6, which are formed at lines of intersection between the screw threads on the female thread portion 4 and the longitudinal grooves, when the earth nut 1 of the invention is screwed onto the weld bolt 9, so that electrical conduction is ensured between the weld bolt 9 and the earth nut. Hereupon, the coating having been peeled off is automatically discharged outside the earth nut through the longitudinal grooves 5 as screwing proceeds between the both elements.

In this manner, when the earth nut of the invention is used, a path for electrical conduction, from the metallic part 11 to the mating member 8 via the earth nut 1 and the weld bolt 9 can be ensured without the provision of any specific means for grounding, and so the metallic part 11 can be surely grounded to the mating member 8. Therefore, it is possible in the invention to provide an more improved grounding quality than that in the case where a conventional nut 20 with a toothed washer is used as an earth nut. Also, when intense fastening leads to application of a large axial force, the earth nut of the invention will not undergo permanent set in fatigue as in the nut 20 with a toothed washer.

As described above, the earth nut of the invention has an advantage in that it is excellent in grounding quality and is free of the possibility of losing the grounding function even upon application of a large axial force, and it is made a one-piece to thereby enable achieving reduction in cost as compared with prior earth nuts. In addition, it goes without saying that the earth nut of the invention can be used for mounting of a metallic part to other various members than a vehicle body.

What is claimed is:

1. An earth nut in combination with a threaded member with which said earth nut is threadably engaged so as to secure a part having a seat surface to a mating member, where the seat surface and the threaded member having a coating film thereon and where the earth nut includes a bottom surface, said earth nut comprising a flanged nut, the flanged nut having a nut body and a flange formed at a lower end of the nut body so as to be integral with the nut body;

wherein a plurality of projections are formed at a lower portion of the flange near an outer peripheral edge of the flange, each of said plurality of projections being configured and arranged to cut and peel off the coating film on the seat surface as the flanged nut is threadably secured to the threaded member, whereby the bottom surface contacts the seat surface;

wherein the nut body includes a female thread portion therein and a plurality of longitudinal grooves provided on screw threads of the female thread portion that extend axially within the nut body; and wherein on one sides of the lines of intersection of the screw threads of the female thread portion of the nut and the longitudinal grooves, edges are formed that are to peel off the coating film adhered to screw threads of the threaded member.

2. The earth nut in combination with the threaded member of claim 1, wherein the projections are formed by downwardly pressing upper portions at a plurality of locations near the outer peripheral edge of the flange.

3. The earth nut in combination with the threaded member of claim 2, wherein the upper portions being downwardly pressed are at an angle offset from a diametrical direction of the flange.

4. The earth nut in combination with the threaded member of claim 2, wherein the projections are three in number and are distributed equally.

5. The earth nut in combination with the threaded member of claim 1, wherein the projections are three in number and are distributed equally.

6. The earth nut in combination with the threaded member of claim 1, wherein the nut body female threaded portion threadably engages the threaded member.

7. The earth nut in combination with the threaded member of claim 1, wherein the coating film is adhered to the seat surface and the threaded member.

8. The earth nut in combination with the threaded member of claim 1, wherein each of the plurality of longitudinal groove is formed in the nut body such that one of surfaces of said each longitudinal groove includes the edges at lines of intersection between the screw threads of the female thread portion of the nut and the longitudinal grooves, each of said edges so formed being configured and arranged so as to cut and peel off the coating film adhered to screw threads of the threaded member.

9. The earth nut in combination with the threaded member of claim 1, wherein the plurality of projections are integral with the flange so there is no relative movement between the plurality of projections and the flange.

10. The earth nut in combination with the threaded member of claim 9, wherein the flanged nut is configured and arranged such that the flanged nut will not undergo set in fatigue from application of an axial force.

11. The earth nut in combination with the threaded member of claim 1, wherein said each longitudinal grove is configured and arranged so the peeled off coating film is directed in a direction so as to be discharged outside the flanged nut as the flanged nut is being threadably secured to the threaded member.

12. The earth nut in combination with the threaded member of claim 1, wherein each of the plurality of longitudinal grove grooves is formed so as to be generally semi-circular in a cross section defined by a plane perpendicular to a long axis of the longitudinal groove.

* * * * *

UNITED STATES PATENT AND TRADEMARK OFFICE

CERTIFICATE OF CORRECTION

PATENT NO. : 6,406,238 B2
DATED : June 18, 2002
INVENTOR(S) : Toshio Takeuchi and Hideki Kakamu It is certified that error appears in the above-identified patent and that said Letters Patent is hereby corrected as shown below:

Title page,
Under ABSTRACT, change -- 12 Claims, 3 Drawings Sheets -- to
-- 10 Claims, 3 Drawing Sheets --

Column 4,
Lines 62-67, delete claims 6 and 7.

Signed and Sealed this

Twenty-fourth Day of December, 2002

JAMES E. ROGAN
*Director of the United States Patent and Trademark Office*